(12) United States Patent
Fatta

(10) Patent No.: US 9,725,572 B2
(45) Date of Patent: Aug. 8, 2017

(54) LIQUID COLOR CONCENTRATE FOR USE IN PLASTIC ARTICLES

(71) Applicant: Badger Color Concentrations, Inc., Mukwonago, WI (US)

(72) Inventor: Mike Fatta, Mukwonago, WI (US)

(73) Assignee: Badger Color Concentrate Inc., Mukwonago, WI (US)

( * ) Notice: Subject to any disclaimer, the term of this patent is extended or adjusted under 35 U.S.C. 154(b) by 170 days.

(21) Appl. No.: 13/891,714

(22) Filed: May 10, 2013

(65) Prior Publication Data

US 2013/0298804 A1    Nov. 14, 2013

Related U.S. Application Data

(60) Provisional application No. 61/645,275, filed on May 10, 2012.

(51) Int. Cl.
| | |
|---|---|
| *B60C 1/00* | (2006.01) |
| *C08K 5/00* | (2006.01) |
| *C08K 5/12* | (2006.01) |
| *C08K 13/02* | (2006.01) |
| *C08J 3/20* | (2006.01) |
| *C08K 3/00* | (2006.01) |

(52) U.S. Cl.
CPC ............ *C08K 5/0016* (2013.01); *C08J 3/203* (2013.01); *C08K 3/0033* (2013.01); *C08K 5/0041* (2013.01); *C08K 5/12* (2013.01); *C08K 13/02* (2013.01); *C08J 2367/02* (2013.01)

(58) Field of Classification Search
CPC ......... C08K 5/0016; C08K 5/12; C08K 13/02
USPC ........................................... 524/287
See application file for complete search history.

(56) References Cited

U.S. PATENT DOCUMENTS

| 2,241,251 | A | * | 5/1941 | Franklin | 106/168.01 |
|---|---|---|---|---|---|
| 2,524,811 | A | * | 10/1950 | Koberlein | C09B 67/008 |
| | | | | | 351/159.24 |
| 3,224,995 | A | * | 12/1965 | De Pree | C08K 5/12 |
| | | | | | 524/287 |
| 3,956,008 | A | * | 5/1976 | Knepper | C08K 9/12 |
| | | | | | 106/464 |
| 3,975,325 | A | * | 8/1976 | Long, Jr. | C08K 5/05 |
| | | | | | 260/DIG. 16 |
| 4,167,503 | A | * | 9/1979 | Cipriani | C08J 3/22 |
| | | | | | 106/499 |
| 4,230,501 | A | * | 10/1980 | Howard et al. | 106/502 |
| 4,341,565 | A | * | 7/1982 | Martenson | 106/475 |
| 4,708,719 | A | * | 11/1987 | Wilson | C09B 67/008 |
| | | | | | 8/527 |
| 4,750,938 | A | * | 6/1988 | Cottrell | A23L 1/275 |
| | | | | | 106/146.5 |
| 4,761,247 | A | * | 8/1988 | Rei | A01N 25/02 |
| | | | | | 252/364 |
| 5,157,067 | A | * | 10/1992 | Burditt | C08J 3/226 |
| | | | | | 106/500 |

(Continued)

FOREIGN PATENT DOCUMENTS

GB            842587     *    7/1960 ............... C08J 3/203

*Primary Examiner* — Jane L Stanley
(74) *Attorney, Agent, or Firm* — Tarollli, Sundheim, Covell & Tummino LLP

(57) ABSTRACT

A liquid color concentrate for use in plastic articles comprises a non-orthophthalate plasticizer and at least one of a colorant, a functional additive or a special effect pigment.

10 Claims, 1 Drawing Sheet

(56) References Cited

U.S. PATENT DOCUMENTS

| | | | | |
|---|---|---|---|---|
| 5,498,344 | A * | 3/1996 | Rei | A01N 43/80 |
| | | | | 252/404 |
| 5,753,742 | A * | 5/1998 | Bumanlag | C08K 5/0016 |
| | | | | 524/501 |
| 5,855,836 | A * | 1/1999 | Leyden et al. | 264/401 |
| 5,882,707 | A * | 3/1999 | Grillo et al. | 426/302 |
| 5,929,132 | A * | 7/1999 | Hani | A01N 25/04 |
| | | | | 523/122 |
| 6,096,822 | A * | 8/2000 | Seven | C08J 3/226 |
| | | | | 524/500 |
| 8,252,855 | B2 * | 8/2012 | Rajaraman et al. | 523/333 |
| 2002/0036950 | A1 * | 3/2002 | Cosman | B01F 13/1055 |
| | | | | 366/152.1 |
| 2007/0179229 | A1 * | 8/2007 | Grass | C07C 29/141 |
| | | | | 524/287 |
| 2009/0156732 | A1 * | 6/2009 | Rajaraman | C08J 3/226 |
| | | | | 524/521 |
| 2010/0089289 | A1 * | 4/2010 | Mahiat | C08J 3/2053 |
| | | | | 106/170.23 |
| 2010/0101449 | A1 * | 4/2010 | Cornish | A01N 43/36 |
| | | | | 106/18.32 |
| 2010/0204395 | A1 * | 8/2010 | Rajaraman | C08J 3/226 |
| | | | | 524/559 |
| 2011/0281987 | A1 * | 11/2011 | Godwin | C08K 5/0016 |
| | | | | 524/291 |
| 2013/0310472 | A1 * | 11/2013 | Becker | B32B 5/18 |
| | | | | 521/73 |
| 2016/0017115 | A1 * | 1/2016 | Fatta | C08K 5/12 |
| | | | | 524/297 |

* cited by examiner

000
LIQUID COLOR CONCENTRATE FOR USE IN PLASTIC ARTICLES

RELATED APPLICATION

This application claims the benefit of U.S. Provisional Patent Application Ser. No. 61/645,275, filed May 10, 2012, the entirety of which is hereby incorporated by reference for all purposes.

TECHNICAL FIELD

The present disclosure relates generally to the use of a liquid color concentrate for use in plastic articles to impart a desired visual and/or physical effect, such as a process additive, a UV additive and/or color.

BACKGROUND

Plastic has taken the place of other materials in a variety of industries. In the packaging industry, plastic has replaced glass to minimize breakage, reduce weight, and reduce energy consumed in manufacturing and transport. In other industries, plastic has replaced metal to minimize corrosion, reduce weight, and provide color-in-bulk products.

Attracting consumers to purchase individually-sized or family-sized containers includes branding and trade dress. Among the elements of valuable trade dress is the color of the plastic article. Moreover, such color may need to co-exist with translucency, transparency, or other special effects for the plastic container.

SUMMARY

According to one aspect of the present disclosure, a liquid color concentrate for use in plastic articles is provided. The liquid color concentrate comprises a non-orthophthalate plasticizer and at least one of a colorant, a functional additive or a special effect pigment.

Another aspect of the present disclosure can include a liquid color concentrate for use in coloring plastic articles. The liquid color concentrate can comprise an amount of 1,4-bis(2-ethylhexyl) benzenedicarboxylate and at least one of a colorant, a functional additive or a special effect pigment.

Another aspect of the present disclosure can include a liquid color concentrate for use in coloring a polyester article. The liquid color concentrate can comprise an amount of 1,4-bis(2-ethylhexyl) benzenedicarboxylate and at least one of a colorant, a functional additive or a special effect pigment.

BRIEF DESCRIPTION OF THE DRAWINGS

The foregoing and other features of the present disclosure will become apparent to those skilled in the art to which the present disclosure relates upon reading the following description with reference to the accompanying drawings, in which.

DETAILED DESCRIPTION

Figure 1:
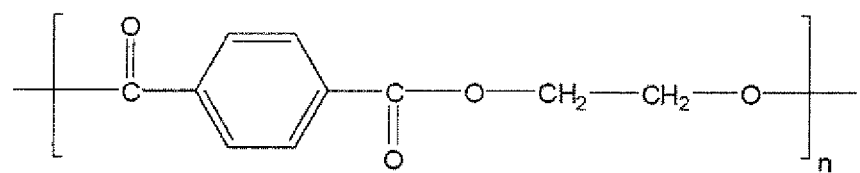
FIG. 1 is an image showing the chemical structure of polyethylene terephthalate.

The present disclosure relates generally to the use of a liquid color concentrate for use in plastic articles to impart a desired visual and/or physical effect, such as a process additive, a UV additive and/or color. One aspect of the present disclosure includes a liquid color concentrate comprising a non-orthophthalate plasticizer and at least one of a colorant, a functional additive or a special effect pigment. Advantageously, the non-orthophthalate plasticizer of the present disclosure is highly compatible with certain polymer resins used to form plastic articles, such as polyester articles (e.g., bottles). Historically, orthophthalates have been used as plasticizers for polyvinyl chloride (PVC)-based products, as well as liquid color carriers for PVC and polyethylene terephthalate (PET)-based products. The fact that the liquid color concentrate of the present disclosure does not include any phthalates, which have been associated with human infertility (e.g., lowered sperm count) is advantageous for reproductive health reasons and, thus, provides the public with a safe alternative to orthophthalate use with certain polymer resins (e.g., PET).

In one aspect of the present disclosure, the liquid color concentrate includes colorant. The colorant can be any combination of one or more additives, pigments, and/or dyes. The choice of colorant is dependent upon the desired color, the machine process, molding temperature, and the end-use of the plastic article.

The science of color is well known to those skilled in the art. Without undue experimentation, one can use color matching techniques to identify a particular location in spherical color space. For example, one skilled in the art can digitally map color space using specific polymer carriers and colorants as raw material ingredients. Alternatively, one can make small samples (i.e., plaques) for visual review.

Colorants are commercially available from a number of sources well known to those skilled in the art. Commercially available pigments are well known to those skilled in the art and include organic and inorganic colorant chemistries. Additionally, commercially available dyes are well known to those skilled in the art and include all organic chemistries. Commercial sources for pigments and dyes include multinational companies, such as BASF, Bayer, Color-Chem International, Sun Chemical, and Zhuhai Skyhigh Chemicals.

Table 1 lists eight commercially available pigment colorants in a variety of primary and secondary colors.

TABLE 1

Commercial Pigment Colorants

| Raw Material Name | CI Name | Family | COLOR | FDA* |
|---|---|---|---|---|
| TIOXIDE R-FC6 WHITE | PIGMENT WHITE 6 | INORGANIC | WHITE | Y |
| REGAL 660R BLACK POWDER | PIGMENT BLACK 7 | ORGANIC | | N |
| MPC CHANNEL BLACK | PIGMENT BLACK 7 | ORGANIC | | Y |
| HELIOGEN BLUE K7090 | PIGMENT BLUE 15:3 | ORGANIC | BLUE | Y |
| HELIOGEN BLUE K6903 | PIGMENT BLUE 15:1 | ORGANIC | BLUE | Y |
| 34L2000 AZURE BLUE | PIGMENT BLUE 28 | INORGANIC | BLUE | Y |
| SICOTAN YELLOW K 2001 FG | PIGMENT BROWN 24 | INORGANIC | YELLOW | Y |
| SICOTAN YELLOW K 1011 | PIGMENT YELLOW 53 | INORGANIC | YELLOW | Y |

*As published by the commercial producer.

Table 2 shows fourteen commercially available dyes.

TABLE 2

Commercial Dye Colorants

| Raw Material Name | CI Name | Family | Color | FDA* |
|---|---|---|---|---|
| Lambdaplast Blue NL | Solvent Blue 59 | Anthraquinone | Blue | N |
| Macrolex Blue RR Granular | Solvent Blue 97 | Anthraquinone | Blue | N |
| Macrolex Green G Granular | Solvent Green 28 | Anthraquinone | Green | N |
| Macrolex Green 5B Granular | Solvent Green 3 | Anthraquinone | Green | N |
| Macrolex Orange R Granular | Disperse Orange 47 | Polymethine | Orange | N |
| Macrolex Orange 3G Granular | Solvent Orange 60 | Perinone | Orange | N |
| Macrolex Red EG Granular | Solvent Red 135 | Perinone | Red | N |
| Macrolex Red E2G Granular | Solvent Red 179 | Perinone | Red | N |
| Thermoplast Red 454 | Solvent Red 195 | Anthraquinone | Red | N |
| Macrolex Red Violet R Granular | Disperse Violet 26 | Anthraquinone | Violet | N |
| Macrolex Red Violet B Granular | Solvent Violet 13 | Anthraquinone | Violet | N |
| Macrolex Violet 3R Granular | Solvent Violet 36 | Anthraquinone | Violet | N |
| Key Plast Yellow 3G | Solvent Yellow 93 | Pyrazolone | Yellow | N |
| Key Plast Yellow AG | Solvent Yellow 114 | Quinopthalone | Yellow | N |

*As published by the commercial producer.

The colorants can be intended for transparent, translucent, and opaque plastic articles, as well as all opacities therebetween as required by end-use application and/or customer preference.

Achievement of a color match of a plaque with a desired color, from the creativity of a designer or a pre-arranged color standard, such as PANTONE color standards from an inventory of commercially available colorants, is relatively straightforward for a skilled color matcher, even if a few iterations are required to satisfy the customer.

The concentration of the colorant(s) in the liquid color concentrate is significant for several reasons, such as the relative cost of the colorant ingredient(s), the need for colorants to be evenly distributed and dispersed throughout the liquid color concentrate, and that the liquid color concentrate have a stable and pourable viscosity, all for consistent and precise addition (letdown) of the liquid color concentrate with the polymer resin during the formation of pre-form bottles or other polyester articles. Letdown ratios can depend upon the concentration of colorant(s) and/or additives in the liquid color concentrate and whether the final molded product or article is intended to be opaque, translucent, or transparent.

The concentration of colorant after letdown into the final molded product or article can range from about 0.05 to about 0.2 weight percent, and preferably from about 0.1 to about 0.5 weight percent.

In another aspect of the present disclosure, the liquid color concentrate can be molded with a polymer resin. Suitable polymer resins can comprise a homopolymer or copolymer containing at least one ester functional group in its main chain. For example, a polymer resin can comprise one or more polyesters. Polyesters can be made in the form of a thermoplastic or a thermoset.

Suitable polyesters can have an average molecular weight ranging from about 100 to about 65000, and preferably from about 150 to about 8000, and most preferably about 192 (i.e., a PET monomer).

The polymer resin can have a glass transition temperature ranging from about −15° C. to about 100° C., and preferably from about 10° C. to about 80° C., and most preferably about 76° C. (i.e., the glass transition temperature of PET).

Figure 2:
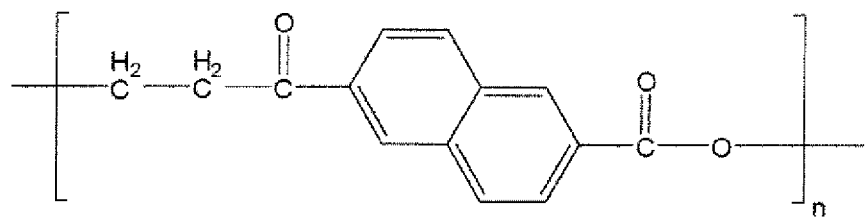
FIG. 2 is an image showing the chemical structure of poly(ethylene 2,6-naphthalate)

Non-limiting examples of polyesters can include PET (FIG. 1), glycol-modified polyethylene terephthalate (PETG), poly(ethylene 2,6-naphthalate) (PEN) (FIG. 2), polytrimethylene terephthalate, polybutylene terephthalate, polyglycolic acid, polylactic acid, polycaprolactone, polyethylene adipate, and polyhydroxyalkanoate.

In one example of the present disclosure, the liquid color concentrate can be molded with PET.

In another example of the present disclosure, the liquid color concentrate can be molded with PETG.

In yet another example of the present disclosure, the liquid color concentrate can be molded with PEN.

Figure 3:
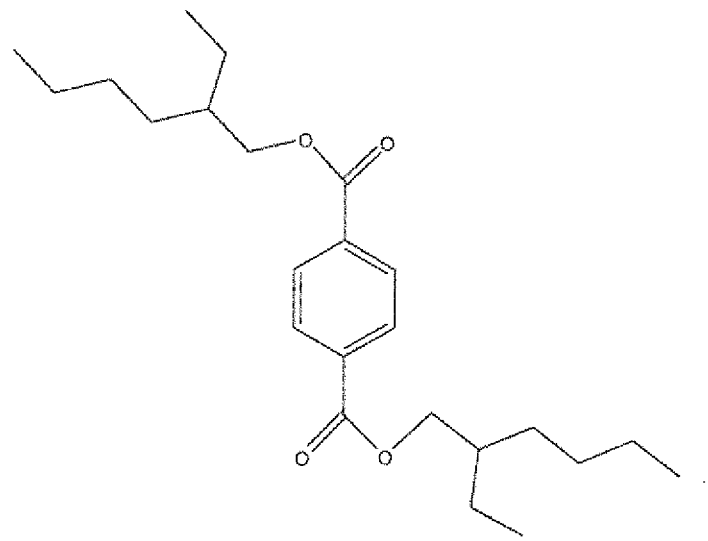
FIG. 3 is an image showing the chemical structure of 1,4-bis(2-ethylhexyl) benzenedicarboxylate.

In another aspect of the present disclosure, the liquid color concentrate includes a non-orthophthalate plasticizer that is compatible with the polymer resin. The amount of the non-orthophthalate plasticizer present in a plastic article can be measured as a percentage of the non-orthophthalate plasticizer in the finished or final plastic article. The non-orthophthalate plasticizer can include a terephthalate, such as bis(2-ethylhexyl)phthalate or 1,4-bis(2-ethylhexyl)benzenedicarobxylate (referred to as DOTP) (FIG. 3), which is commercially available as EASTMAN 168 (Eastman Chemical Company, Kingsport, Tenn.). In one example, about 0.01% to about 10% of the non-orthophthalate plasticizer can be present in a plastic article (e.g., a bottle).

In some instances, a transparent letdown ration (LDR) can be as low as 0.01 lbs. per 100 lbs (of polymer resin). Thus, for a transparent LDR of 0.01 lbs. per 100 lbs., the corresponding percentage of non-orthophthalate plasticizer present in the plastic article would be indicated as "0.01% in finished part." Similarly, if a molder was to use a liquid color concentrate (but without any pigments, additives, etc.) at a 5% LDR, the amount of the non-orthophthalate plasticizer present in the plastic article would be indicated as "about 5% in the finished part". In other words, one skilled in the art would understand the following calculation in this instance: 100 lbs. of plastic resin plus 5 lbs. of a non-orthophthalate plasticizer would yield a total weight of 105 lbs.; therefore, one would understand 0.0476% of the non-orthophthalate plasticizer in final part.

In another aspect, the liquid color concentrate include about 5% to about 100% (e.g., about 8% to about 99.9%) of the non-orthophthalate plasticizer depending, for example, on the colorant type and loading necessary to achieve a desired technical effect. The amount of the non-orthophthalate plasticizer present in the liquid color concentrate can be measured as a percentage of other additives and/or liquids present in the liquid color concentrate. In one example, a white liquid color concentrate can be formulated as follows: about 8% DOTP; about 8% plasticizer (e.g., mineral oil or benzoic acid); about 4% suspension improvement additive; about 1% thixotrope; and about 79% $TiO_2$. In another example, a transparent liquid color concentrate can be formulated as follows: about 95% DOTP; about 1% Solvent Blue 97; and about 4% thixotrope.

In another aspect of the present disclosure, the liquid color concentrate can additionally or optionally include at least one functional additive to improve processing or performance of one or more constituents of the liquid color concentrate. For example, functional additives for polyester bottles can include anti-oxidants, anti-stats, acetaldehyde scavengers, blowing agents, biocides, exfoliated nanoclays, thickeners, and the like. Generally, minor amounts of such additives provide improvement of performance to the liquid color concentrate during processing with the other ingredients in the polymer resin or in performance of the molded article after manufacturing. One skilled in the art can determine the appropriate concentration of one or more additives without undue experimentation.

Frequently, preparation of a colored plastic article (e.g., a polyester article) does not involve merely color, but also special effect features, such as granite, translucent, pearls, metallics, fluorescents, iridescents, marbles, etc.

Plastic articles exposed to natural sunlight are exposed to ultraviolet rays that can harm the color of the article. Therefore, it is customary (but not required) to include ultraviolet light stabilizers in the liquid color concentrate. The optional additive can add value to the liquid color concentrate as the ultraviolet stabilizer also helps protect the plastic article from adverse effects arising from exposure to ultraviolet rays.

Commercially available stabilizers are well known to those skilled in the art and can include, for example, thermal stabilizers and Tinuvin brand stabilizers (BASF, Florham Park, N.J.), such as Tinuvin 234 stabilizer.

It will be appreciated that known types of mixing and injection molding machinery can be used to make the liquid color concentrate and form plastic articles (e.g., colored polyester articles) using the liquid color concentrate. Mixing equipment used to make the liquid color concentrate can include any suitable equipment already used in the manufacture of liquid products. For example, such equipment can include high speed "Cowles" type dispersers, media mills and three-roll mills. Mixing equipment can operate at mixing speeds ranging from about 100 rpm to about 10,000 rpm, and preferably from about 500 to about 8000 rpm. Mixing equipment can operate at temperatures ranging from about 25° C. to about 100° C., and preferably from about 40° C. to about 80° C.

The following example is for the purpose of illustration only and is not intended to limit the scope of the claims, which are appended hereto.

Example

Several DOTP-based color concentrates, with letdown ratios up to 5%, were injection molded with polymers (PET, PEN and PETG) with the following results:

Clarity: when measured by a Datacolor SF650 spectrophotometer in transmission mode, the samples all had excellent clarity with no effect versus the clarity of the base polymer resin without the DOTP-based color concentrate.

Viscosity: the viscosity of the DOTP-based color concentrate was at a level where it would be stable and have good shelf life. It showed good dispersion of the pigments and good viscosity for pumping.

Processing: the polymers were injection molded with levels up to, and including, 5% DOTP without screw slippage and with no change to the polymers haze.

The liquid blends were made using a lab Cowles type mixer.

From the above description of the disclosure, those skilled in the art will perceive improvements, changes and modifications. Such improvements, changes, and modifications are within the skill of the art and are intended to be covered by the appended claims.

The following is claimed:

1. A liquid color concentrate for use in plastic articles, said liquid color concentrate consisting of:
   a non-ortho-substituted terephthalate plasticizer providing 5% to 95% by weight of the liquid color concentrate;
   at least one of one or more colorants or special effect pigments,
   and optionally one or more functional additives selected from the group consisting of anti-oxidants, anti-stats, acetaldehyde scavengers, and blowing agents.

2. The liquid color concentrate of claim 1, wherein said colorant comprises pigment, a dye, a combination of pigments, a combination of dyes, a combination of pigments and dye, a combination of pigment and dyes, or a combination of pigments and dyes.

3. The liquid color concentrate of claim 1, wherein said terephthalate is 1,4-bis(2-ethylhexyl) benzenedicarboxylate.

4. The liquid color concentrate of claim 1, wherein the liquid color concentrate consists of:
   a non-ortho-substituted terephthalate plasticizer providing 5% to 95% by weight of the liquid color concentrate;
   at least one of one or more colorants,
   and optionally one or more functional additives selected from the group consisting of anti-oxidants, anti-stats, acetaldehyde scavengers, and blowing agents.

5. A plastic article colored by a liquid color concentrate, said liquid color concentrate consisting of:
   an amount of a non-ortho-substituted terephthalate plasticizer providing 5% to 95% by weight of the liquid color concentrate; and
   at least one of one or more colorants or special effect pigments, and optionally one or more functional additives selected from the group consisting of anti-oxidants, anti-stats, acetaldehyde scavengers, and blowing agents.

6. The plastic article of claim 5, wherein said colorant comprises pigment, a dye, a combination of pigments, a combination of dyes, a combination of pigments and dye, a combination of pigment and dyes, or a combination of pigments and dyes.

7. The plastic article of claim 5, having been molded with a polyester resin.

8. The plastic article of claim 7, wherein said polyester resin is selected from the group consisting of polyethylene terephthalate (PET), glycol-modified polyethylene terephthalate (PETG), and poly(ethylene 2,6-naphthalate) (PEN).

9. The plastic article of claim 5, wherein said amount of non-orthophthalate plasticizer is present in an amount from about 0.01% to about 10% of the plastic article.

10. The plastic article of claim 5, wherein said terephthalate is 1,4-bis(2-ethylhexyl) benzenedicarboxylate.

* * * * *